(12) United States Patent
Yun

(10) Patent No.: US 11,505,045 B2
(45) Date of Patent: Nov. 22, 2022

(54) STRUCTURE FOR PREVENTING OPPOSITE SLIDING DOORS FROM SWAYING

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 386 days.

(21) Appl. No.: 16/868,084

(22) Filed: May 6, 2020

(65) Prior Publication Data

US 2021/0162843 A1 Jun. 3, 2021

(30) Foreign Application Priority Data

Dec. 3, 2019 (KR) .......................... 10-2019-0158953

(51) Int. Cl.
| | |
|---|---|
| *E05F 11/00* | (2006.01) |
| *B60J 5/06* | (2006.01) |
| *E05D 15/06* | (2006.01) |
| *E05D 15/10* | (2006.01) |

(Continued)

(52) U.S. Cl.
CPC ............ *B60J 5/06* (2013.01); *E05D 15/0665* (2013.01); *E05D 15/101* (2013.01); *E05D 15/30* (2013.01); *E05F 11/54* (2013.01); *E05D 2015/1026* (2013.01); *E05D 2015/1031* (2013.01); *E05Y 2201/708* (2013.01); *E05Y 2201/72* (2013.01); *E05Y 2201/722* (2013.01); *E05Y 2900/531* (2013.01)

(58) Field of Classification Search
CPC ......... B60J 5/06; B60J 5/047; E05D 15/0665; E05D 15/101; E05D 15/30; E05D 2015/1026; E05D 2015/1031; E05F 11/54; E05Y 2201/708; E05Y 2201/72; E05Y 2201/722; E05Y 2201/61; E05Y 2201/684; E05Y 2201/688; E05Y 2900/531
USPC .......................................................... 49/360
See application file for complete search history.

(56) References Cited

U.S. PATENT DOCUMENTS

| | | | |
|---|---|---|---|
| 4,502,246 A * | 3/1985 | Minami .................. | E05F 5/003 49/213 |
| 5,895,089 A * | 4/1999 | Singh ........................ | B60J 5/06 49/213 |

(Continued)

FOREIGN PATENT DOCUMENTS

KR 101684536 B1 12/2016

*Primary Examiner* — Jerry E Redman
(74) *Attorney, Agent, or Firm* — Slater Matsil, LLP

(57) ABSTRACT

A structure for preventing opposite sliding doors from swaying is provided. The structure includes a lower rail mounted in a longitudinal direction at a lower side of a vehicle body, a lower rail roller unit rollably connected to the lower rail, a lower rail swing arm rotatably connected to the lower rail roller unit and a door, a guide roller unit fixedly connected to the lower rail, the guide roller unit including a guide roller rotatably connected to the lower rail, and a guide stopper fixedly connected to the door. The guide stopper includes a guide route formed inside the guide stopper and configured to serve as a rolling movement route for the guide roller, an exit/entrance portion formed at a first end of the guide route, and a stop portion formed at a second end of the guide route.

20 Claims, 9 Drawing Sheets

(51) Int. Cl.
   *E05D 15/30*   (2006.01)
   *E05F 11/54*   (2006.01)

(56) References Cited

U.S. PATENT DOCUMENTS

| | | | | |
|---|---|---|---|---|
| 5,979,971 A * | 11/1999 | Mizuki | ............... | B60L 50/66 |
| | | | | 49/213 |
| 6,036,257 A * | 3/2000 | Manuel | ............... | E05D 15/1081 |
| | | | | 49/213 |
| 6,926,342 B2 * | 8/2005 | Pommeret | ............... | E05D 15/1081 |
| | | | | 296/146.12 |
| 7,641,261 B2 * | 1/2010 | Rusnak | ............... | E05D 15/1047 |
| | | | | 49/449 |
| 7,934,767 B2 * | 5/2011 | Kim | ............... | B60J 5/062 |
| | | | | 49/360 |
| 8,122,644 B2 * | 2/2012 | Jarolim | ............... | B61D 19/02 |
| | | | | 49/209 |
| 8,353,555 B2 * | 1/2013 | Boettcher | ............... | E05D 15/1047 |
| | | | | 296/146.12 |
| 9,163,443 B2 * | 10/2015 | Yun | ............... | E05D 15/10 |
| 9,718,331 B2 * | 8/2017 | Maruyama | ............... | E05B 83/40 |
| 9,822,579 B2 * | 11/2017 | Maruyama | ............... | B60J 5/047 |
| 11,002,054 B2 * | 5/2021 | Stoepker | ............... | E05D 15/1047 |
| 11,313,163 B2 * | 4/2022 | Yun | ............... | E05D 15/30 |
| 2008/0129085 A1 * | 6/2008 | Kim | ............... | E05F 5/003 |
| | | | | 296/190.11 |
| 2010/0078961 A1 * | 4/2010 | Takaya | ............... | B60J 5/06 |
| | | | | 296/155 |
| 2016/0356069 A1 | 12/2016 | Choi et al. | | |
| 2018/0119465 A1 * | 5/2018 | Wojdyla | ............... | E05D 15/30 |
| 2021/0087866 A1 * | 3/2021 | Yun | ............... | E05D 15/0621 |
| 2021/0115711 A1 * | 4/2021 | Min | ............... | E05B 85/26 |
| 2021/0172238 A1 * | 6/2021 | Yun | ............... | E05D 15/1042 |
| 2022/0120126 A1 * | 4/2022 | Yun | ............... | E05D 15/0682 |
| 2022/0120131 A1 * | 4/2022 | Yun | ............... | B60J 5/06 |

\* cited by examiner

STRUCTURE FOR PREVENTING OPPOSITE SLIDING DOORS FROM SWAYING

CROSS-REFERENCE TO RELATED APPLICATIONS

This application claims priority to Korean Patent Application No. 10-2019-0158953, filed in the Korean Intellectual Property Office on Dec. 3, 2019, which application is hereby incorporated herein by reference.

TECHNICAL FIELD

The present invention relates to a structure for preventing opposite sliding doors from swaying.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

However, the sliding type occupant compartment opening/closing door in the related art requires three rails (an upper rail, a center rail, and a lower rail) that support an upper portion, a middle portion, and a lower portion of the door, respectively, during the process of opening or closing the door, and the sliding type occupant compartment opening/closing door also requires components related to the rails. For this reason, the sliding type occupant compartment opening/closing door in the related art has a problem in that the weight of the vehicle and the number of components are increased and a degree of design freedom of the vehicle deteriorates.

Therefore, there has been developed a two-rail type door system for a vehicle in which a sliding door is slidably supported only with center and lower rails. For example, Korean Patent No. 10-1684536 (counterpart U.S. Pat. No. 9,777,811: Sliding Door Device for Vehicle) in the related art discloses that a door rail (i.e., a center rail) is mounted on a sliding door, a vehicle body rail (i.e., a lower rail) is mounted on a vehicle body, and the sliding door is opened or closed as a center slider coupled to the door rail and a lower slider coupled to the vehicle body rail are moved.

However, referring to FIGS. 1 and 2, in the sliding structure in the related art, as support points at which the sliding door is supported, two support points including a contact point A between the vehicle body rail and the lower slider and a contact point B between the center rail and the center slider are formed in a vertical direction. However, there is a problem in that the sliding door rotates about an imaginary axis X connecting the contact points. In addition, because the support points for the sliding door are formed only on the imaginary axis X, there remains only one contact point in a load direction (direction of the imaginary axis X) when a load of the sliding door is applied, and as a result, the sliding door cannot be stably supported.

SUMMARY

The present invention relates to a structure for preventing opposite sliding doors from swaying. Particular embodiments relate to a structure for preventing opposite sliding doors from swaying, the structure being capable of preventing the sway of the sliding door and stably supporting the sliding door while the sliding door is operated in a vehicle mounted with the sliding door and having only center and lower rails.

Embodiments of the present invention provide a new type of structure capable of preventing sway of a sliding door and supporting a load while the sliding door is opened or closed in a vehicle mounted with the sliding door and having only center and lower rails.

An exemplary embodiment of the present invention provides a structure for preventing opposite sliding doors from swaying, the structure including a lower rail mounted in a longitudinal direction at a lower side of a vehicle body, a lower rail roller unit rollably connected to the lower rail, a lower rail swing arm rotatably connected to the lower rail roller unit and the door, a guide roller unit fixedly connected to the lower rail and having a guide roller rotatably connected thereto, and a guide stopper fixedly connected to the door. The guide stopper includes a guide route formed inside the guide stopper and configured to serve as a rolling movement route for the guide roller, an exit/entrance portion formed at one end of the guide route and configured to allow the guide roller to enter or exit the exit/entrance portion, and a stop portion formed at the other end of the guide route and configured to restrict a movement of the guide roller.

According to embodiments of the present invention, because the door is supported at three support points by the connection between the guide roller unit and the guide stopper, the door may be stably supported.

According to embodiments of the present invention, because the sway of the door is prevented, a latch mounted on the door and a striker mounted on the vehicle body may be easily fastened, such that the door may be stably closed.

According to embodiments of the present invention, because the exit/entrance portion of the guide stopper is large, the guide roller may be easily inserted into the guide stopper.

According to embodiments of the present invention, because an upper surface of the guide roller is in contact with the guide stopper, the door is prevented from sagging due to a load of the door.

DETAILED DESCRIPTION OF ILLUSTRATIVE EMBODIMENTS

Figure 1:
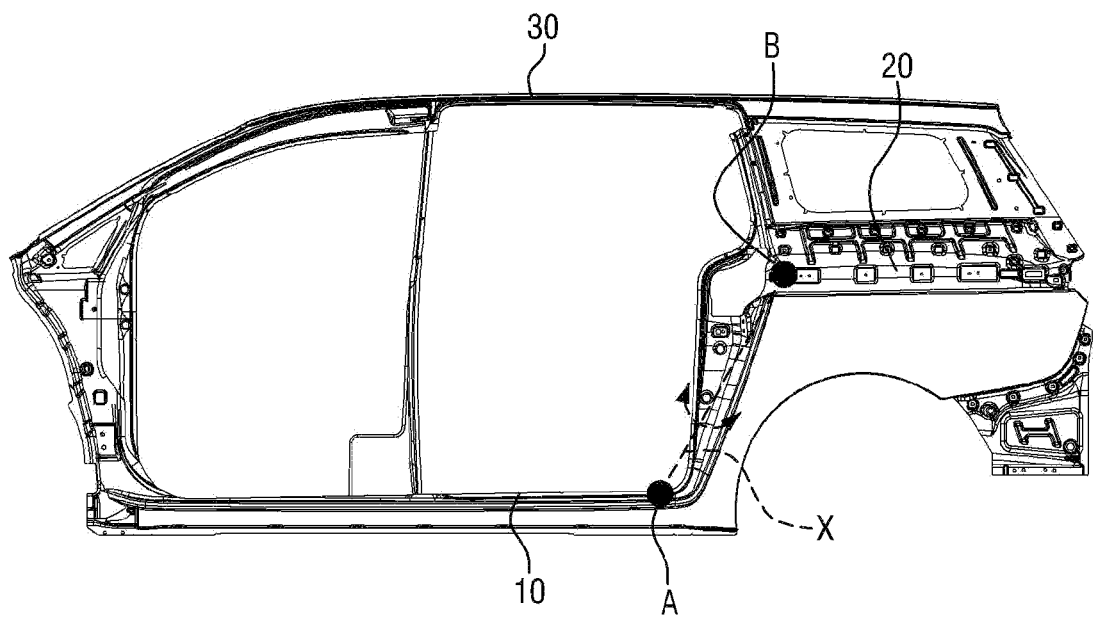
FIG. 1 is a view illustrating support points at which a sliding door for a vehicle having only center and lower rails in the related art is supported.
Figure 2:
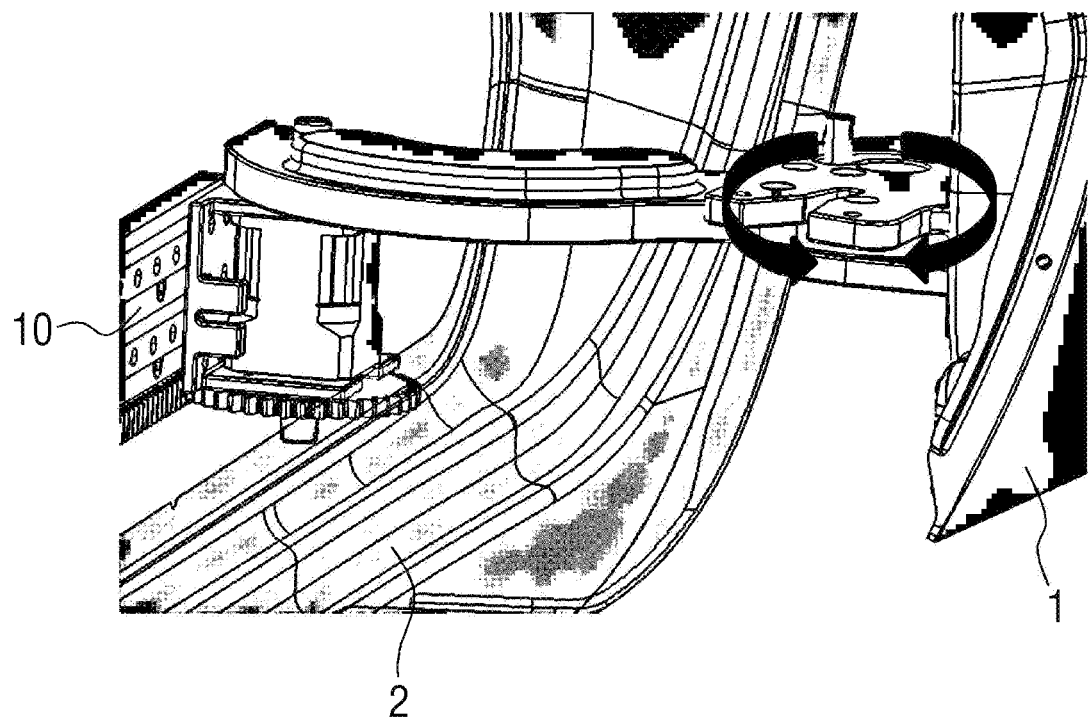
FIG. 2 is a view illustrating a state in which the sliding door illustrated in FIG. 1 is rotatable.

Hereinafter, exemplary embodiments of a structure for preventing opposite sliding doors from swaying will be described in detail with reference to the drawings. Terms or words used herein should not be interpreted as being limited to a general or dictionary meaning and should be interpreted as a meaning and a concept which conform to the technical spirit of embodiments of the present invention based on a principle that an inventor can appropriately define a concept of a term in order to describe his/her own invention by the best method.

According to an exemplary embodiment of the present invention, a vehicle has a lower rail 10 (a rail disposed at a lower side of the vehicle) and a center rail 20 (a rail disposed at a center of the vehicle), but does not have an upper rail 30 (a rail disposed at an upper side of the vehicle). Here, the lower rail 10 is provided on a vehicle body 2, and the center rail 20 is provided on a sliding door 1.

The sliding doors 1 include a front door and a rear door, and the structure for preventing opposite sliding doors from swaying according to the exemplary embodiment of the present invention is applied to the lower rail 10 of the front door or the rear door. Therefore, the structures for preventing opposite sliding doors from swaying, which are applied to the front door and the rear door, respectively, are identical in configuration and operational principle. However, in the present specification, for convenience of description, an example in which the structure for preventing opposite sliding doors from swaying is applied to any one of the sliding doors 1 will be described.

Figure 3:
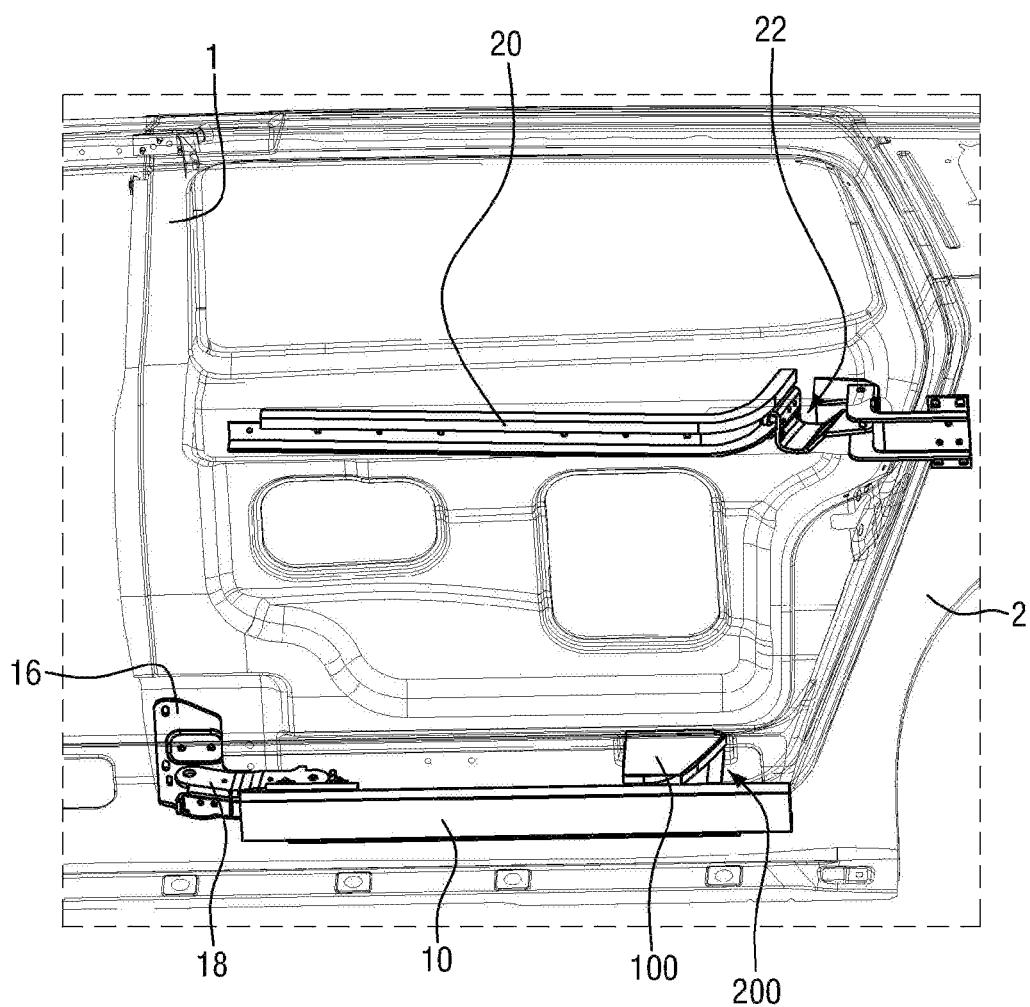
FIG. 3 is a view illustrating a state in which a sway prevention structure according to an exemplary embodiment of the present invention is mounted on a sliding door.
Figure 4:
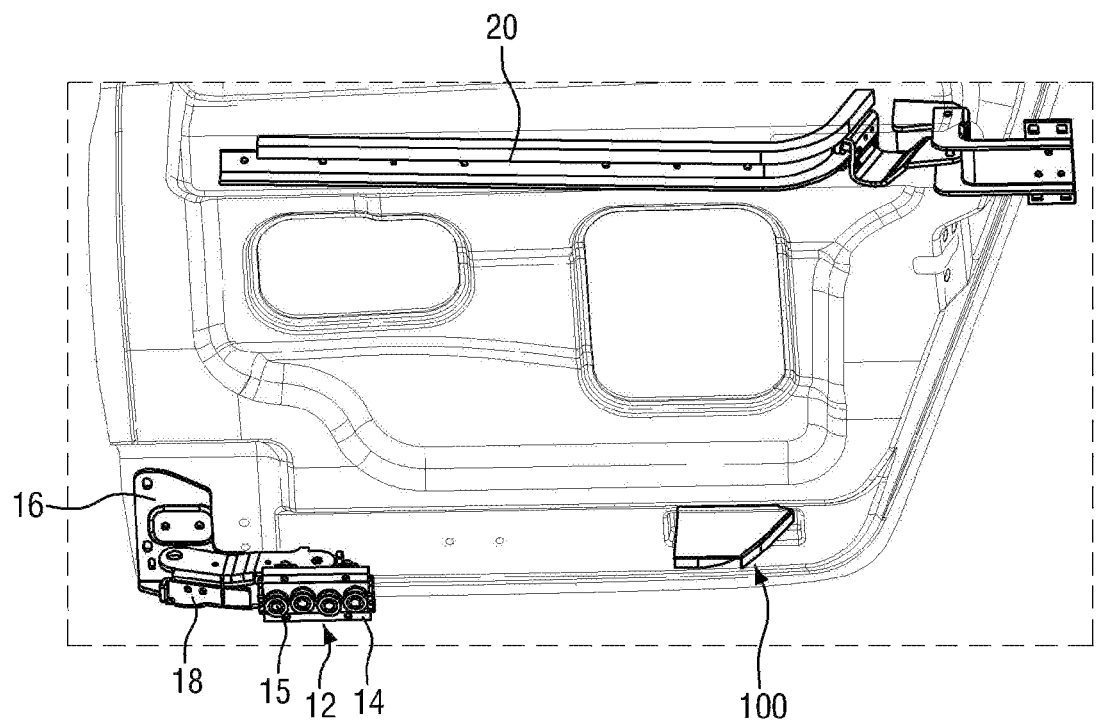
FIG. 4 is a view illustrating a state in which a guide stopper according to an exemplary embodiment of the present invention is mounted on a door.
Figure 5:
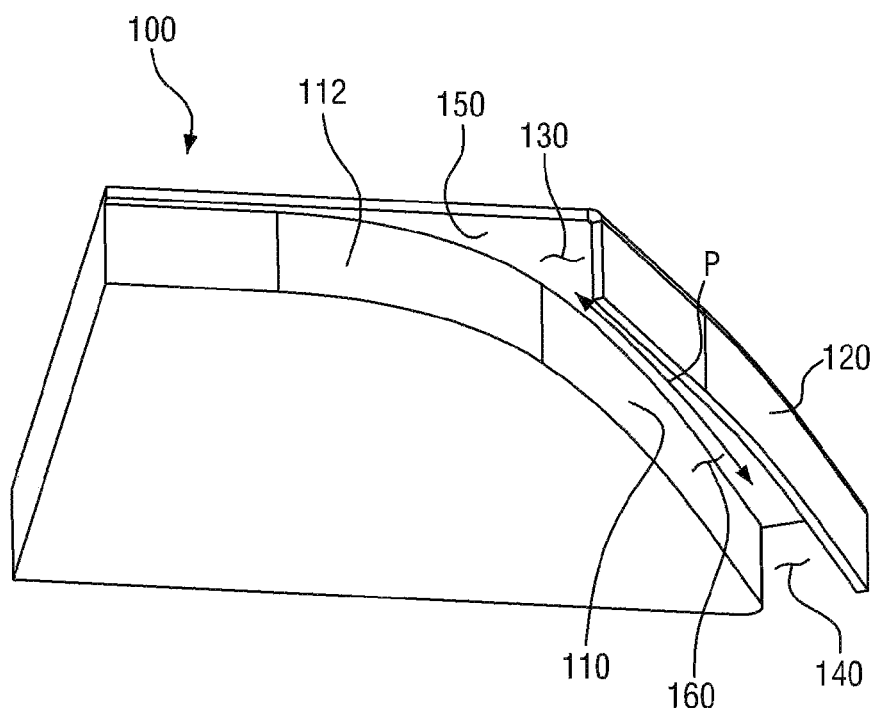
FIG. 5 is a view illustrating a guide stopper according to an exemplary embodiment of the present invention.
Figure 6:
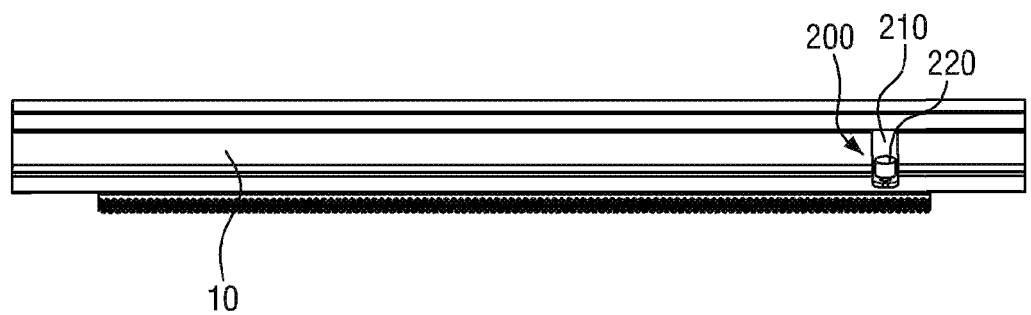
FIG. 6 is a view illustrating a state in which a guide roller unit according to an exemplary embodiment of the present invention is mounted on a lower rail.

FIG. 3 is a view illustrating a state in which a sway prevention structure according to an exemplary embodiment of the present invention is mounted on a sliding door, FIG. 4 is a view illustrating a state in which a guide stopper according to an exemplary embodiment of the present invention is mounted on a door, FIG. 5 is a view illustrating a guide stopper according to an exemplary embodiment of the present invention, and FIG. 6 is a view illustrating a state in which a guide roller unit according to an exemplary embodiment of the present invention is mounted on a lower rail.

Referring to FIG. 3, a structure for preventing opposite sliding doors from swaying according to an exemplary embodiment of the present invention is provided at lower sides of the vehicle body 2 and the door 1 and includes the lower rail 10, a lower rail roller unit 12, a lower rail swing arm 18, a guide stopper 100, and a guide roller unit 200.

One end of the lower rail roller unit 12 is inserted into the lower rail 10 provided in a longitudinal direction of the vehicle body 2, such that the lower rail roller unit 12 is rollably coupled to the lower rail 10. Specifically, as illustrated in FIG. 4, the lower rail roller unit 12 includes a slider 14, and rollers 15 provided on the slider 14 are inserted into the lower rail 10 and rollably coupled to the lower rail 10. The lower rail roller unit 12 moves in the longitudinal direction of the vehicle body 2 while being guided by the lower rail 10.

One end of the lower rail swing arm 18 is rotatably connected to a lower mounting bracket 16 fixedly mounted inside the door 1, and the other end of the lower rail swing arm 18 is rotatably connected to the lower rail roller unit 12. Therefore, when the door 1 moves, the lower rail swing arm 18 may rotate about the lower rail roller unit 12 and may rectilinearly move along the lower rail 10.

Meanwhile, as described above, in an exemplary embodiment of the present invention, the center rail 20 is fixed to the door 1. A center rail roller unit 22 is rollably connected to the center rail 20. The center rail roller unit 22 is rotatably connected to a center mounting bracket (not illustrated) fixedly connected to the vehicle body 2 through a center rail swing arm (not illustrated).

The guide stopper 100 is positioned at a position spaced apart from the lower mounting bracket 16 at a predetermined distance and fixedly connected to an inner lower portion of the door 1. There is no limitation on a distance between the guide stopper 100 and the lower mounting bracket 16, but the guide stopper 100 and the lower mounting bracket 16 may be spaced apart from each other to the extent that the door 1 may be stably supported. In an exemplary embodiment of the present invention, the guide stopper 100 is positioned to approximately face the lower rail 10. However, the position of the guide stopper 100 may be variously set as long as the guide stopper 100 may be connected to the guide roller unit 200.

Referring to FIG. 5, a guide route P is formed in the guide stopper 100, and the guide route P is a rolling movement route for a guide roller 220 to be described below. In an exemplary embodiment of the present invention, the guide route P takes a posture approximately inclined with respect to the guide stopper 100 in a direction in which the door 1 is closed (in a left direction in FIG. 5).

A first sidewall no and a second sidewall 120 are formed at both sides of the guide route P. The first sidewall no is positioned in the direction in which the door 1 is closed (in the left direction in FIG. 4), and the second sidewall 120 is positioned in the direction in which the door 1 is opened (in the right direction in FIG. 4). That is, the first and second sidewalls 110 and 120 of the guide route P are disposed in the longitudinal direction of the vehicle body 2. The first sidewall no includes a curved portion 112 curved in the direction in which the door 1 is closed. The second sidewall 120 has an approximately straight shape.

An exit/entrance portion 130 is formed at one end of the guide route P so that the guide roller 220 enters the guide stopper 100 or exits the guide stopper 100. A stop portion 140 is formed at the other end of the guide route P to stop the movement of the guide roller 220. Here, the stop portion 140 according to an exemplary embodiment of the present invention is formed on an inner surface of the door 1. However, according to another exemplary embodiment of the present invention, the stop portion 140 may be formed as a separate member corresponding to the inner surface of the door 1.

A distance between the first and second sidewalls 110 and 120 at the exit/entrance portion 130 is larger than a diameter of the guide roller 220. In contrast, a distance between the first and second sidewalls 110 and 120 at the stop portion 140 has a length similar to a diameter of the guide roller 220. However, the distance between the first and second sidewalls 110 and 120 at the stop portion 140 may be set to further include a length made by adding the value corresponding to a predetermined gap to the diameter of the guide roller 220 in order to minimize the sway of the guide roller 220. Since the curved portion 112 of the first sidewall no is formed adjacent to the exit/entrance portion 130, the distance between the first and second sidewalls 110 and 120 at the exit/entrance portion 130 is larger than the distance between the first and second sidewalls 110 and 120 at the stop portion 140.

An upper end contact portion 150 is formed at an upper side of the guide route P, and the upper end contact portion 150 may come into contact with an upper surface of the guide roller 220. A lower end opening portion 160 is formed at a lower side of the guide route P and is opened so that the guide roller unit 200 may be easily received.

The guide roller unit 200 serves to prevent the sway of the door 1 by being connected to or disconnected from the guide stopper 100, and includes a support member 210. Referring to FIG. 6, one end of the support member 210 is fixedly connected to the lower rail 10, and the guide roller 220 is rotatably connected to the other end of the support member 210. In the exemplary embodiment of the present invention, one end of the support member 210 is positioned at a position closer to a side, between both sides in the longitudinal direction of the lower rail 10, in the direction in which the door 1 is opened (in the right direction in FIG. 6), and the support member 210 is fixedly connected to the lower rail 10 without interfering with the lower rail roller unit 12. The support member 210 is provided perpendicular to the lower rail 10 so that the other end of the support member 210 is directed toward the door 1. Therefore, the guide roller 220 may be easily received in the exit/entrance portion 130 of the guide stopper 100.

Figure 7:
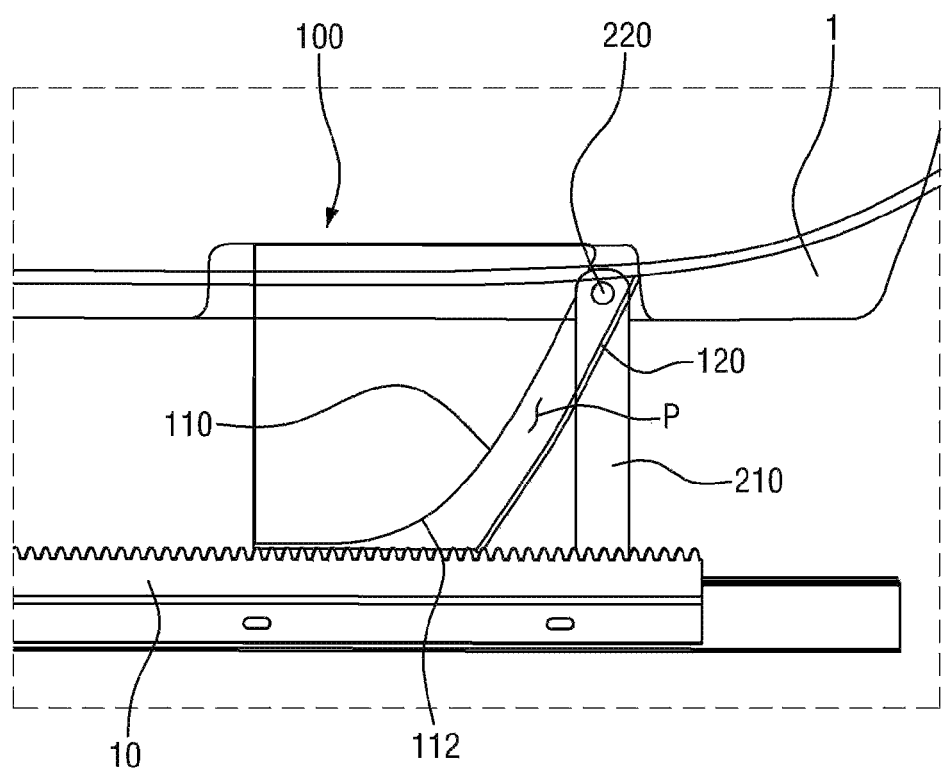
FIG. 7 is a view illustrating a state in which a guide roller unit and a guide stopper according to an exemplary embodiment of the present invention are connected.

FIG. 7 is a view illustrating a state in which a guide roller unit and a guide stopper according to an exemplary embodiment of the present invention are connected.

Referring to FIG. 7, with the operation of the door 1, the guide roller 220 may move along the guide route P through the exit/entrance portion 130. In this case, the guide roller 220 may rotate in a state of being in contact with the first sidewall 110 or the second sidewall 120, and the upper surface of the guide roller 220 may come into contact with the upper end contact portion 150. The guide roller 220 moves along the guide route P and then stops moving at the stop portion 140.

Figure 8A:
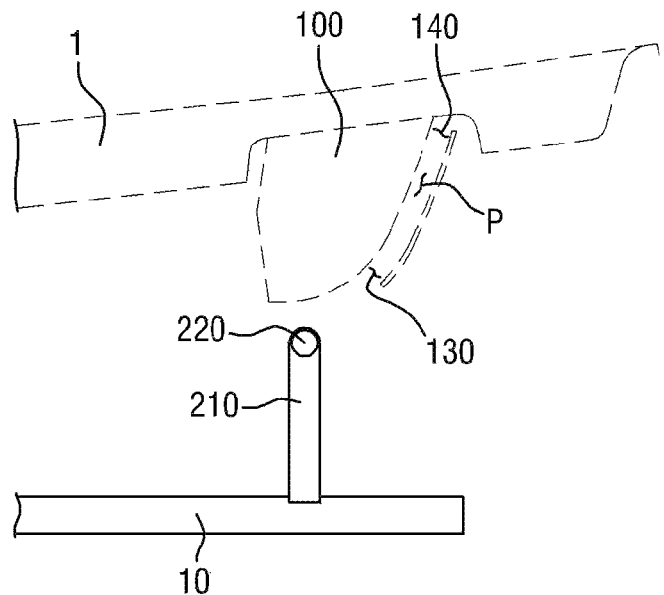
FIGS. 8A to 8C are views illustrating an operating process of a sway prevention structure according to an exemplary embodiment of the present invention while the sliding door moves from an opened state to a closed state.
Figure 8B:
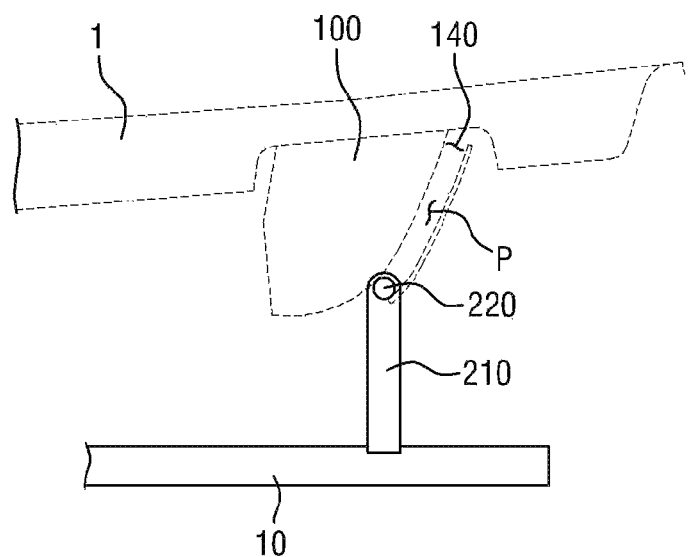
Figure 8C:
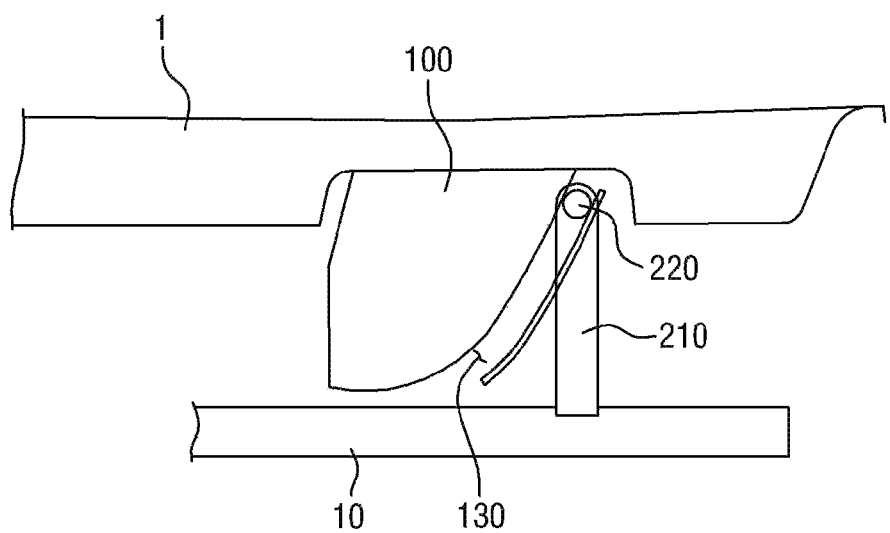

FIGS. 8A to 8C are views illustrating an operating process of a sway prevention structure according to an exemplary embodiment of the present invention while the sliding door moves from an opened state to a closed state. Meanwhile, the door 1 illustrated in FIGS. 8A to 8C is closed while moving from the right side to the left side.

As illustrated in FIG. 8A, in the state in which the door 1 is opened, the guide route P is positioned closer to the right side than the guide roller 220 is to the right side. In this case, the lower rail swing arm 18 is in a state of being completely rotated in one direction (in an unfolded state), and the lower rail roller unit 12 is positioned at a left end of the lower rail 10. In this state, the distance between the door 1 and the vehicle body 2 is longest.

As illustrated in FIG. 8B, when the door 1 begins to be closed, the lower rail swing arm 18 rotates in the other direction while moving to the left side along the lower rail 10 by means of the lower rail roller unit 12. Then, the distance between the door 1 and the vehicle body 2 begins to be gradually decreased. In this case, the guide roller 220 enters the guide route P through the exit/entrance portion 130. Since the first sidewall 110 has the curved portion 112 and the distance between the first sidewall no and the second sidewall 120 is larger than the diameter of the guide roller 220, the guide roller 220 may smoothly enter the exit/entrance portion 130.

The guide roller 220 moves along the guide route P while rotating in the state of being in contact with the first sidewall no or the second sidewall 120, while the door 1 is still closed. Here, since the distance between the first sidewall no and the second sidewall 120 further includes the length made by adding the value corresponding to a predetermined gap to the diameter of the guide roller 220 or the diameter of the guide roller 220, the guide roller 220 is prevented from swaying in the longitudinal direction of the vehicle body 2 (in the left-right direction in FIG. 8B). In addition, since the upper surface of the guide roller 220 comes into contact with the upper end contact portion 150, the door 1 is stably supported against a load applied downward to the door 1.

When the door 1 is completely closed, the lower rail swing arm 18 is positioned at the right end of the lower rail 10 by means of the lower rail roller unit 12, and the lower rail swing arm 18 is in the state of being completely rotated in the other direction (in the folded state). As illustrated in FIG. 8C, in the state in which the door 1 is completely closed, the guide roller 220 moves along the guide route P and then stops moving at the stop portion 140.

An operating process reverse to the above-mentioned operating process of the sway prevention structure according to an exemplary embodiment of the present invention may be performed while the closed door 1 is opened.

Figure 9:
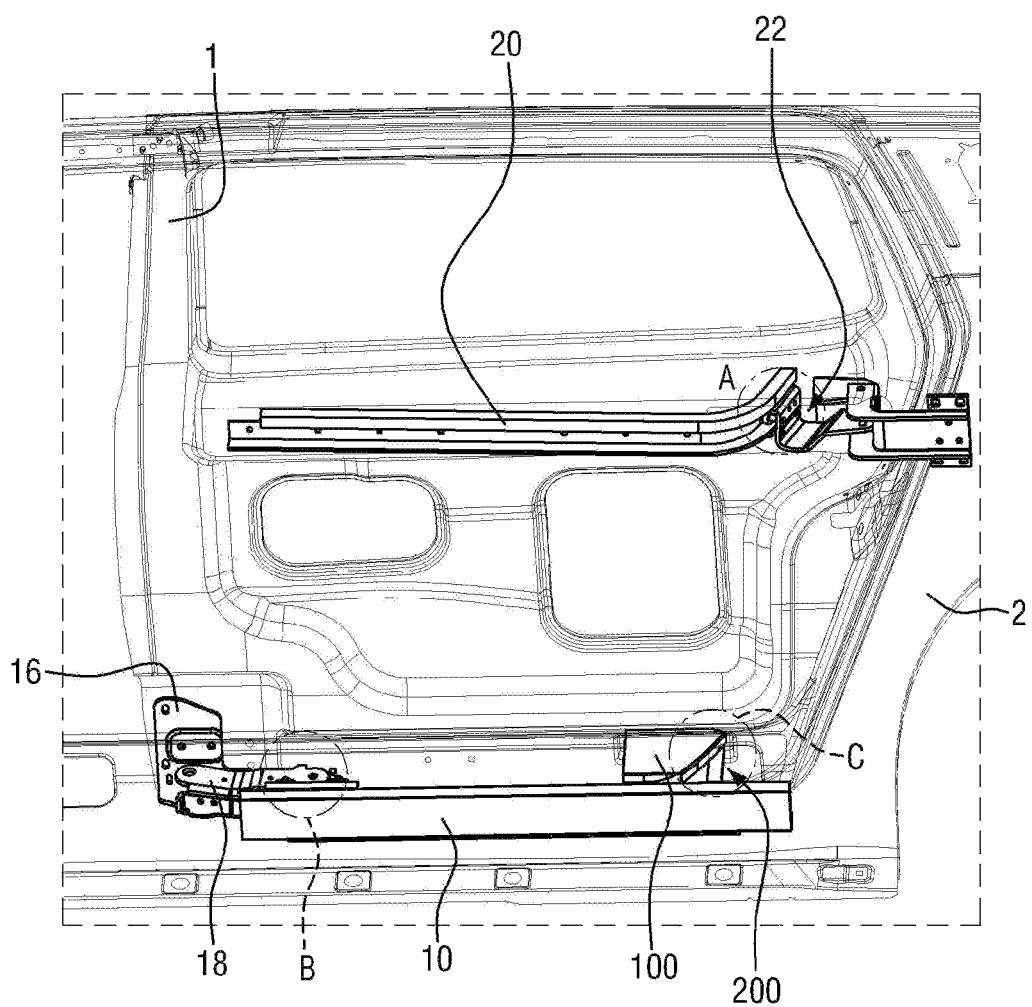
FIG. 9 is a view illustrating three support points at which the sliding door is supported by a sway prevention structure according to an exemplary embodiment of the present invention.

FIG. 9 is a view illustrating three support points at which a sliding door is supported by a sway prevention structure according to an exemplary embodiment of the present invention.

As illustrated in FIG. 9, according to an exemplary embodiment of the present invention, the door 1 is supported at three support points, and the support points include a contact point A between the center rail 20 and the center rail roller unit 22, a contact point B between the lower rail 10 and the lower rail roller unit 12, and a contact point C between the guide roller 220 and the guide route P. The three support points A, B, and C define an approximately triangular shape. The three support points A, B, and C may be formed while the door 1 moves, as a result of which the door 1 may be stably supported.

Meanwhile, when the door 1 is closed, a latch (not illustrated) mounted on the door 1 and a striker (not illustrated) mounted on the vehicle body 2 are fastened. If the door 1 sways while the door 1 is closed, it is difficult to fasten the latch and the striker. In order to solve the problem, the sway of the door 1 is prevented by the connection between the guide stopper 100 and the guide roller unit 200 according to an exemplary embodiment of the present invention, as a result of which the latch and the striker are easily fastened.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A structure for preventing opposite sliding doors from swaying, the structure comprising:
   a lower rail mounted in a longitudinal direction at a lower side of a vehicle body;
   a lower rail roller unit rollably connected to the lower rail;
   a lower rail swing arm rotatably connected to the lower rail roller unit and a door;

a guide roller unit fixedly connected to the lower rail, the guide roller unit including a guide roller rotatably connected to the lower rail; and a guide stopper fixedly connected to the door, the guide stopper comprising:
  a guide route formed inside the guide stopper and configured to serve as a rolling movement route for the guide roller;
  an exit/entrance portion formed at a first end of the guide route and configured to allow the guide roller to enter or exit the exit/entrance portion; and
  a stop portion formed at a second end of the guide route and configured to restrict a movement of the guide roller.

2. The structure of claim 1, wherein the guide roller unit comprises a support member having a first end fixedly connected to the lower rail, and wherein the guide roller is rotatably connected to a second end of the support member.

3. The structure of claim 2, wherein the support member is provided perpendicular to the lower rail, the second end of the support member facing the door.

4. The structure of claim 1, wherein the guide roller unit is positioned closer to a side, between both sides in a longitudinal direction of the lower rail, in a direction in which the door is opened.

5. The structure of claim 1, wherein sidewalls are disposed in the longitudinal direction of the vehicle body and formed at both sides of the guide route, and the guide roller is rotatable in a state of being in contact with one of the sidewalls.

6. The structure of claim 5, wherein one of the sidewalls comprises a curved portion having a curved shape configured to guide the guide roller to the inside of the guide stopper.

7. The structure of claim 5, wherein a distance between the sidewalls at the exit/entrance portion is larger than a diameter of the guide roller, and a distance between the sidewalls at the stop portion is equal to a diameter of the guide roller.

8. The structure of claim 5, wherein the guide route comprises:
  a lower end opening portion opened, at a lower end thereof, to receive the guide roller; and
  an upper end contact portion with which an upper surface of the guide roller comes into contact.

9. The structure of claim 1, wherein the guide route is inclined in a direction in which the door is closed.

10. The structure of claim 1, further comprising:
  a center rail formed at a middle portion of the door; and
  a center rail roller unit connected to the center rail.

11. The structure of claim 10, wherein the door is supported at three support points, the three support points comprising a first contact point between the center rail and the center rail roller unit, a second contact point between the lower rail and the lower rail roller unit, and a third contact point between the guide roller and the guide route.

12. A vehicle comprising:
  a vehicle body;
  a door connected to the vehicle body;
  a lower rail mounted at a lower side of the vehicle body in a longitudinal direction of the vehicle body;
  a lower rail roller unit rollably connected to the lower rail;
  a lower rail swing arm rotatably connected to the lower rail roller unit and the door;
  a guide roller unit comprising:
    a support member having a first end fixedly connected to the lower rail; and
    a guide roller rotatably connected to the lower rail and to a second end of the support member;
  a guide stopper fixedly connected to the door, the guide stopper comprising:
    a guide route formed inside the guide stopper and configured to serve as a rolling movement route for the guide roller;
    an exit/entrance portion formed at a first end of the guide route and configured to allow the guide roller to enter or exit the exit/entrance portion; and
    a stop portion formed at a second end of the guide route and configured to restrict a movement of the guide roller.

13. The vehicle of claim 12, further comprising sidewalls disposed in the longitudinal direction of the vehicle body and formed at both sides of the guide route, wherein one of the sidewalls comprises a curved portion having a curved shape configured to guide the guide roller to the inside of the guide stopper.

14. The vehicle of claim 13, wherein a distance between the sidewalls at the exit/entrance portion is larger than a diameter of the guide roller, and a distance between the sidewalls at the stop portion is equal to a diameter of the guide roller.

15. The vehicle of claim 12, wherein the guide route is inclined in a direction in which the door is closed.

16. The vehicle of claim 12, wherein the guide route comprises:
  a lower end opening portion opened at a lower end to receive the guide roller; and
  an upper end contact portion in contact with an upper surface of the guide roller.

17. The vehicle of claim 12, further comprising:
  a center rail formed at a middle portion of the door; and
  a center rail roller unit connected to the center rail.

18. The vehicle of claim 17, wherein the door is supported at three support points, the three support points comprising a first contact point between the center rail and the center rail roller unit, a second contact point between the lower rail and the lower rail roller unit, and a third contact point between the guide roller and the guide route.

19. A sway prevention structure comprising:
  a lower rail mounted at a lower side of a vehicle body;
  a lower rail roller unit comprising a slider and rollers provided on the slider, the rollers being inserted into and rollably coupled to the lower rail;
  a lower mounting bracket mounted inside a door;
  a lower rail swing arm having a first end rotatably connected to the lower mounting bracket and a second end rotatably connected to the lower rail roller unit;
  a guide roller unit fixedly connected to the lower rail, the guide roller unit including a guide roller rotatably connected to the lower rail; and
  a guide stopper fixedly connected to the door, the guide stopper comprising:
    a guide route formed inside the guide stopper;
    a first sidewall and a second sidewall formed at respective sides of the guide route, the first sidewall including a curved portion curved in a direction in which the door is closed;
    an exit/entrance portion formed at a first end of the guide route;
    a stop portion formed at a second end of the guide route;
    an upper end contact portion formed at an upper side of the guide route; and a lower end opening portion formed at a lower side of the guide route.

20. The sway prevention structure of claim 19, further comprising:
a center rail formed at a middle portion of the door; and
a center rail roller unit connected to the center rail, wherein the door is supported at three support points, the three support points comprising a first contact point between the center rail and the center rail roller unit, a second contact point between the lower rail and the lower rail roller unit, and a third contact point between the guide roller and the guide route.

* * * * *